United States Patent
Kawasaki et al.

(10) Patent No.: US 8,384,391 B2
(45) Date of Patent: Feb. 26, 2013

(54) COLD CATHODE IONIZATION VACUUM GAUGE, VACUUM PROCESSING APPARATUS HAVING THE SAME, DISCHARGE STARTING AUXILIARY ELECTRODE USED FOR THE SAME, AND METHOD OF MEASURING PRESSURE USING THE SAME

(75) Inventors: Yohsuke Kawasaki, Yamanashi (JP); Hideo Mano, Chofu (JP)

(73) Assignee: Canon Anelva Corporation, Kawasaki-shi (JP)

( * ) Notice: Subject to any disclaimer, the term of this patent is extended or adjusted under 35 U.S.C. 154(b) by 40 days.

(21) Appl. No.: 13/106,315

(22) Filed: May 12, 2011

(65) Prior Publication Data

US 2011/0279127 A1    Nov. 17, 2011

(30) Foreign Application Priority Data

May 14, 2010  (JP) .................................. 2010-111854
Dec. 8, 2010   (JP) .................................. 2010-273245

(51) Int. Cl.
  *G01L 21/30*  (2006.01)
  *G01L 21/34*  (2006.01)
(52) U.S. Cl. ....................... 324/460; 324/463
(58) Field of Classification Search .................. 324/460, 324/463
See application file for complete search history.

(56) References Cited

U.S. PATENT DOCUMENTS

| 5,198,772 A | 3/1993 | Peacock et al. ............... 324/463 |
| 5,767,629 A * | 6/1998 | Baptist .......................... 315/168 |
| 6,407,382 B1 * | 6/2002 | Spangler ....................... 250/286 |
| 2010/0164502 A1 | 7/2010 | Kawasaki |
| 2010/0259273 A1 | 10/2010 | Kawasaki et al. |

FOREIGN PATENT DOCUMENTS

| JP | 64-19711 A | 1/1989 |
| JP | 6-26967 A | 2/1994 |
| JP | 10-19711 A | 1/1998 |
| JP | 2008-304360 A | 12/2008 |

OTHER PUBLICATIONS

English translation of JP2008-304360A (Takeshi et al., publication date: Dec. 18, 2008), 13 pages.*

* cited by examiner

*Primary Examiner* — Amy He
(74) *Attorney, Agent, or Firm* — Fitzpatrick, Cella, Harper & Scinto (57) ABSTRACT

The present invention provides a cold cathode ionization vacuum gauge that can trigger discharge in a short time even after a long period of operation. The cold cathode ionization vacuum gauge of an embodiment of the present invention includes an anode, a cathode disposed so as to form a discharge space together with the anode, and a discharge starting auxiliary electrode disposed in the discharge space and electrically connected to the cathode. The discharge starting auxiliary electrode has an electrode part disposed in parallel with an axially longitudinal direction of the anode.

7 Claims, 8 Drawing Sheets

COLD CATHODE IONIZATION VACUUM GAUGE, VACUUM PROCESSING APPARATUS HAVING THE SAME, DISCHARGE STARTING AUXILIARY ELECTRODE USED FOR THE SAME, AND METHOD OF MEASURING PRESSURE USING THE SAME

BACKGROUND OF THE INVENTION

1. Field of the Invention

The present invention relates to a cold cathode ionization vacuum gauge having a discharge starting auxiliary electrode triggering discharge, a vacuum processing apparatus having the cold cathode ionization vacuum gauge, a discharge starting auxiliary electrode, and a method of measuring pressure using the cold cathode ionization vacuum gauge.

2. Description of the Related Art

A cold cathode ionization vacuum gauge triggers gas ionization by self-discharge between an anode and a cathode to measure the internal pressure of a vacuum container which constitutes a vacuum processing apparatus. There are known cold cathode ionization vacuum gauges: penning type, magnetron type, and inverted magnetron type, (refer to Japanese Patent Laid-Open No. H10-19711). In particular, the magnetron type and the inverted magnetron type have a structure in which electron-trapping efficiency is high and which enables a stable sustained discharge even in a high-vacuum region, thus being suitable for measurement in high-vacuum regions.

In a cold cathode ionization vacuum gauge, it is necessary to apply a high voltage thereto to trigger the gas ionization for starting the discharge. There is generated a delay, however, between the timing at which a high voltage is applied to the cold cathode ionization vacuum gauge and the timing at which a discharge current begins to flow due to the start of sustained discharge. The time delay affects the period of time before the start of measurement.

According to a cold cathode ionization vacuum gauge disclosed in Japanese Patent Laid-Open No. H06-26967, a cathode has a discharge-triggering means for directly irradiating electromagnetic radiation sufficient to cause the cathode to emit photoelectrons, thus shortens the period of time for discharge-triggering between the application of a voltage and the start of sustained discharge. According to a cold cathode ionization vacuum gauge disclosed in Japanese Patent Laid-Open No. 2008-304360, an ignition auxiliary tool for triggering discharge is provided at cathode side to shorten the period of time for discharge-triggering between the application of a voltage and the start of sustained discharge.

The cold cathode ionization vacuum gauge disclosed in Japanese Patent Laid-Open No. H06-26967, however, has a drawback of complicated structure of apparatus because the gauge separately has a glow lamp, an ultraviolet ray irradiation lamp, or the like as a means for triggering the discharge and has a circuit for the means. Regarding the cold cathode ionization vacuum gauge disclosed in Japanese Patent Laid-Open No. H06-26967, since the gauge gives high efficiency of trapping charged particles, the wall surface of container of the vacuum gauge is easily sputtered. Consequently, when the gauge is used for a long period of time, sputtered films or products stick to the lamp surface to impair the irradiation of ultraviolet rays. Consequently, the generation of photoelectrons which cause the start of discharge reduces, and thus triggering the discharge becomes difficult.

On the other hand, the cold cathode ionization vacuum gauge disclosed in Japanese Patent Laid-Open No. 2008-304360 has a drawback of short effective period of shortening the time of triggering discharge, thus shortening the life of the gauge owing to the presence of sputtered films and deposited films stuck to the surface of electrode resulted from long use period of the gauge, or owing to the presence of films generated from reaction with residual gases.

SUMMARY OF THE INVENTION

An object of the present invention is to provide a cold cathode ionization vacuum gauge, a vacuum processing apparatus having the cold cathode ionization vacuum gauge, and a discharge starting auxiliary electrode which can trigger discharge in a short time even after a long period of use without complicated structure of apparatus.

The cold cathode ionization vacuum gauge according to the present invention comprises: an anode; a cathode disposed so as to form a discharge space together with the anode; and a discharge starting auxiliary electrode disposed in the discharge space and electrically connected to the cathode, and the discharge starting auxiliary electrode has an electrode part disposed in parallel with an axially longitudinal direction of the anode. Furthermore, the vacuum processing apparatus of the present invention comprises the above-described cold cathode ionization vacuum gauge. Alternatively, the discharge starting auxiliary electrode according to the present invention is the one for use in a cold cathode vacuum gauge having an anode, a cathode disposed so as to form a discharge space together with the anode, and a discharge starting auxiliary electrode disposed in the discharge space and electrically connected to the cathode, and the discharge starting auxiliary electrode has an electrode part disposed in parallel with the axially longitudinal direction of the anode.

The present invention can trigger discharge in a short time without making an apparatus complicated even when sputtered films and products stick to the inside of the measuring element of the vacuum gauge after a long period of use.

DETAILED DESCRIPTION OF THE INVENTION

Embodiments for carrying out the present invention will be described in the following referring to the drawings. Members, layouts, and the like described hereinafter are embodied examples of the present invention, and they are not to limit the scope of the present invention. It is a matter of course to include various modifications without departing from the spirit of the invention.

[First Embodiment]

Figure 1:
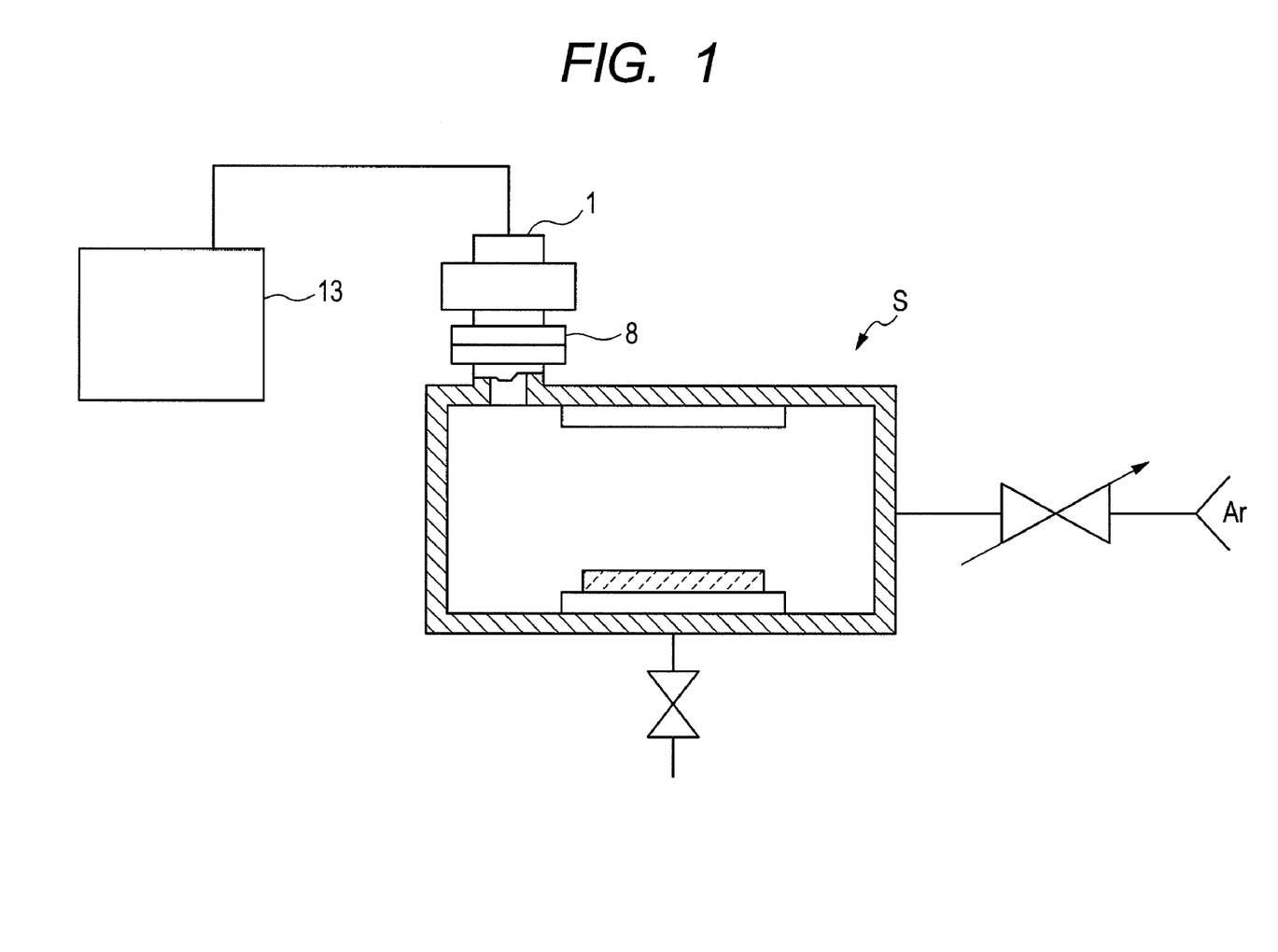
FIG. 1 is a schematic sectional view of a vacuum processing apparatus having a cold cathode ionization vacuum gauge according to a first embodiment of the present invention.
Figure 2:
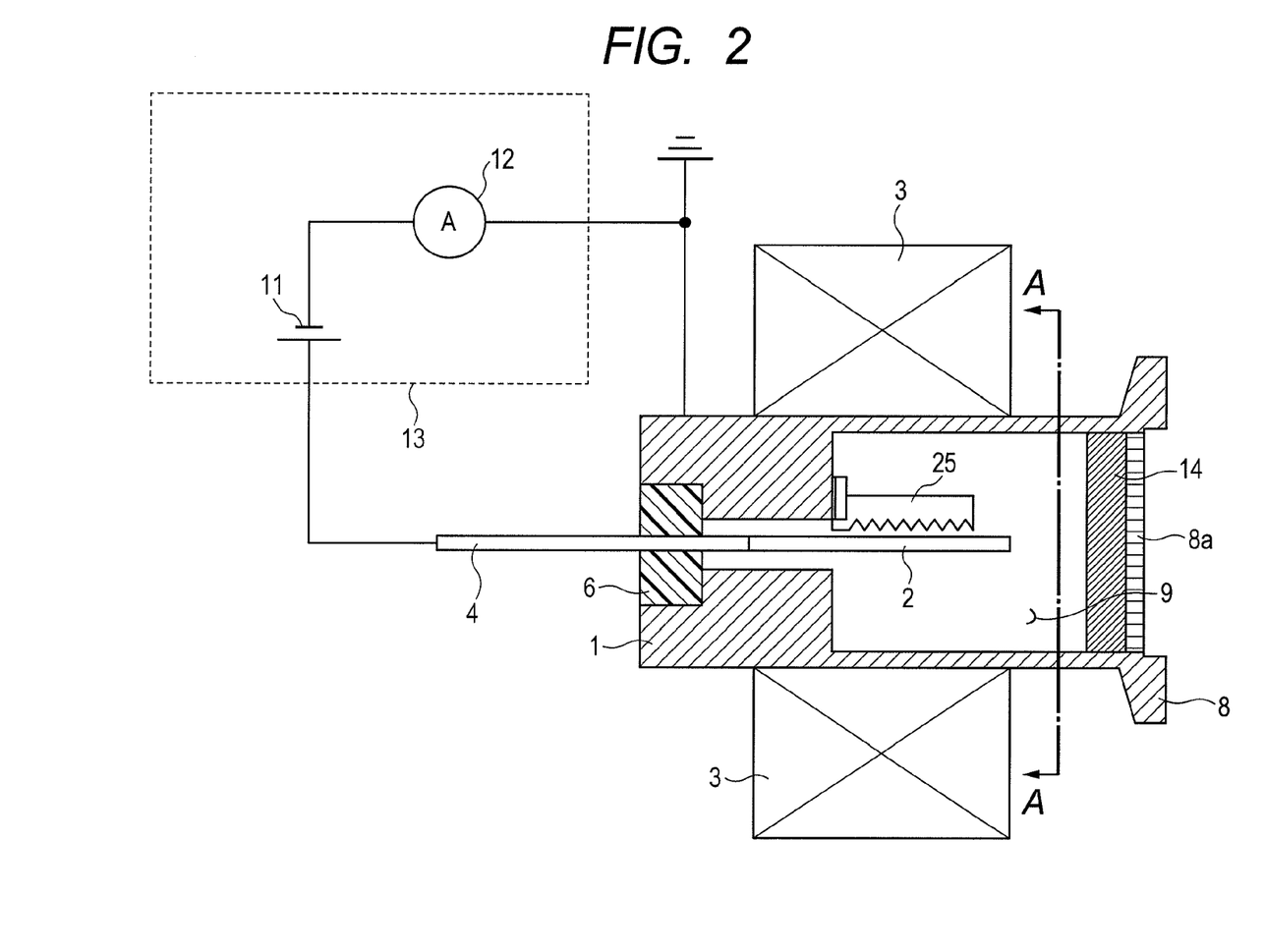
FIG. 2 is a transverse sectional view of the cold cathode ionization vacuum gauge according to the first embodiment of the present invention.
Figure 3:
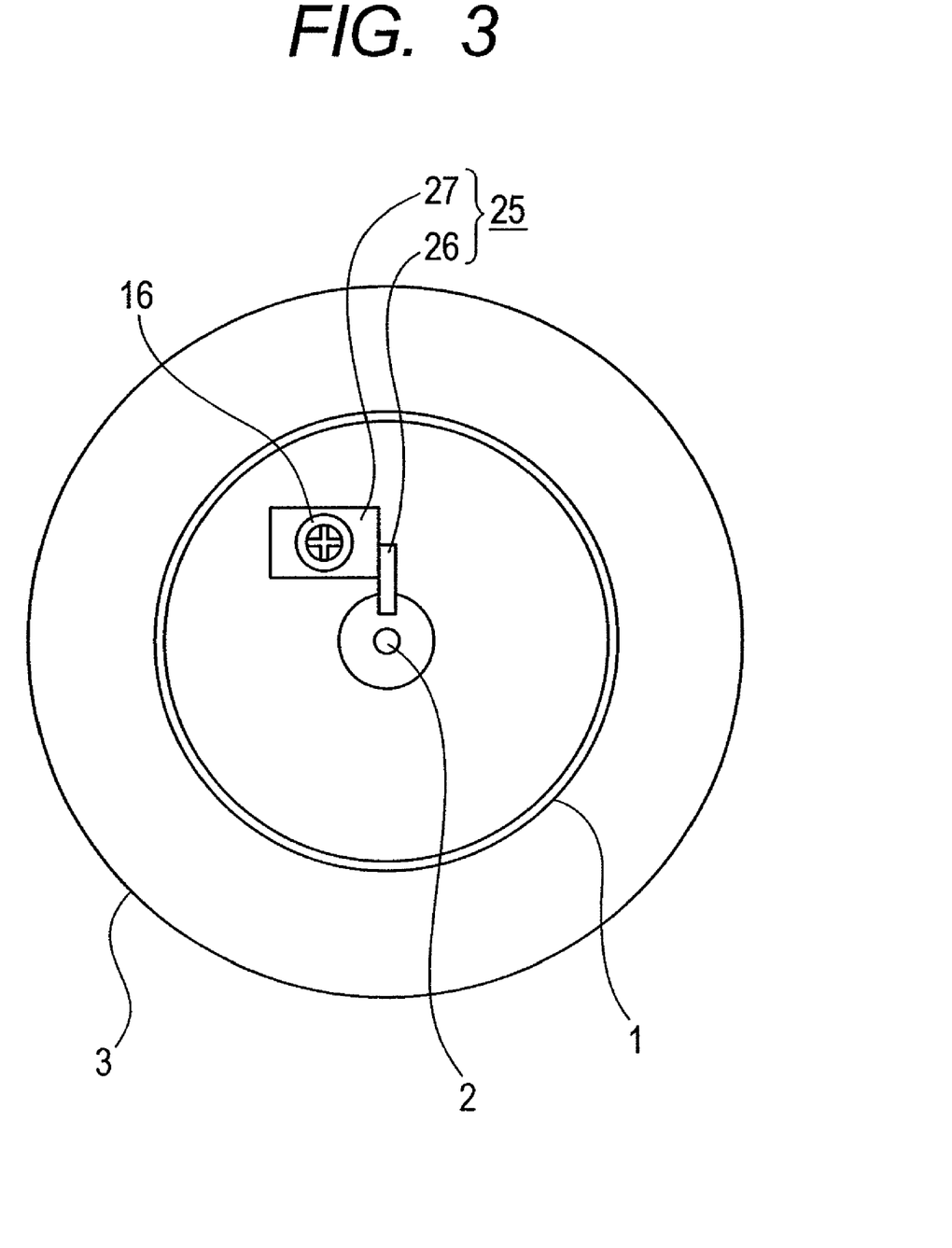
FIG. 3 is a schematic sectional view taken along the line A-A of FIG. 2.

FIGS. 1 to 6 are the drawings for illustrating the vacuum processing apparatus and the cold cathode ionization vacuum gauge attached thereto according to the first embodiment of the present invention. FIG. 1 is a schematic sectional view of a vacuum processing apparatus having the cold cathode ionization vacuum gauge according to the first embodiment of the present invention, and FIG. 2 is a schematic transverse sectional view of the cold cathode ionization vacuum gauge according to the first embodiment of the present invention. FIG. 3 is a sectional view (fragmentary view) taken along the line A-A of FIG. 2. FIGS. 4A and 4B illustrate the respective enlarged views of a discharge starting auxiliary electrode according to the first embodiment of the present invention. FIGS. 5A to 5E and FIG. 6 illustrate examples of other structures of the discharge starting auxiliary electrode.

As illustrated in FIG. 1, the cold cathode ionization vacuum gauge is mounted on the wall surface of a known vacuum container constituting a vacuum processing apparatus S. The cold cathode ionization vacuum gauge is hermetically mounted on an opening on the wall surface of the vacuum container. Reference numeral 1 in the drawing signifies a measuring element container (cathode) constituting the cold cathode ionization vacuum gauge, reference numeral 8 signifies a connection flange, and reference numeral 13 signifies a vacuum gauge operating circuit.

A sputtering apparatus is described herein as an example of the vacuum processing apparatus S. The present invention, however, is not limited to the example. For instance, the cold cathode ionization vacuum gauge of the present invention can be suitably applied to a deposition apparatus such as PVD apparatus and CVD apparatus, and also to an ashing apparatus and a dry-etching apparatus.

FIG. 2 is a schematic transverse sectional view of the cold cathode ionization vacuum gauge according to the first embodiment. FIG. 3 is a fragmentary view taken along the line A-A. For both FIG. 2 and FIG. 3, the same part has the same reference numeral. The cold cathode ionization vacuum gauge of the first embodiment is an inverted magnetron type vacuum gauge, which has components of a measuring element container 1 as the cathode, a rod-shape anode 2, and a magnet 3 disposed on the outer circumference of the measuring element container 1 as the cathode and acting as a magnetic means for creating a magnetic field.

The measuring element container 1 (cathode) is a metal member in near-cylindrical shape, and has a discharge space 9 formed on a side of one internal end thereof. The measuring element container (cathode) 1 has one end on the discharge space 9 side opened, and the other end sealed by an insulating member 6. There are provided the connection flange 8 and a filter 8a at the open end on the discharge space 9 side. The filter 8a is made of a stainless steel mesh or the like, and the insulating member 6 contains an insulating stone such as alumina-ceramic. A current leading-in rod 4 penetrates through the insulating member 6 and is hermetically fixed thereto. There is disposed a pole piece 14 adjacent to the filter 8a so as to regulate a magnetic field.

By attaching the connection flange 8 of the measuring element container (cathode) 1 to the opening of the vacuum container, the space in the vacuum container and the discharge space 9 in the measuring element container (cathode) 1 are brought into a state allowing air to pass through via the filter 8a. Thus the internal pressure of the vacuum container can be measured. The magnet 3 is attached to the measuring element container (cathode) 1 in a ring shape so as to surround the outer circumference thereof. The magnet 3 is preferably a permanent magnet such as ferrite magnet.

The anode 2 is in a rod shape and disposed in the discharge space 9 formed inside the measuring element container (cathode) 1, and has one end connected to the current leading-in rod 4. The current leading-in rod 4 is connected to the vacuum gauge operating circuit 13 outside the measuring element container (cathode) 1. The vacuum gauge operating circuit 13 has a power source 11 to apply voltage, and a discharge current detection part 12 to measure the discharge current flowing through the vacuum gauge operating circuit 13. Furthermore, a discharge starting auxiliary electrode 25 is provided in the measuring element container (cathode) 1.

Figure 4A:
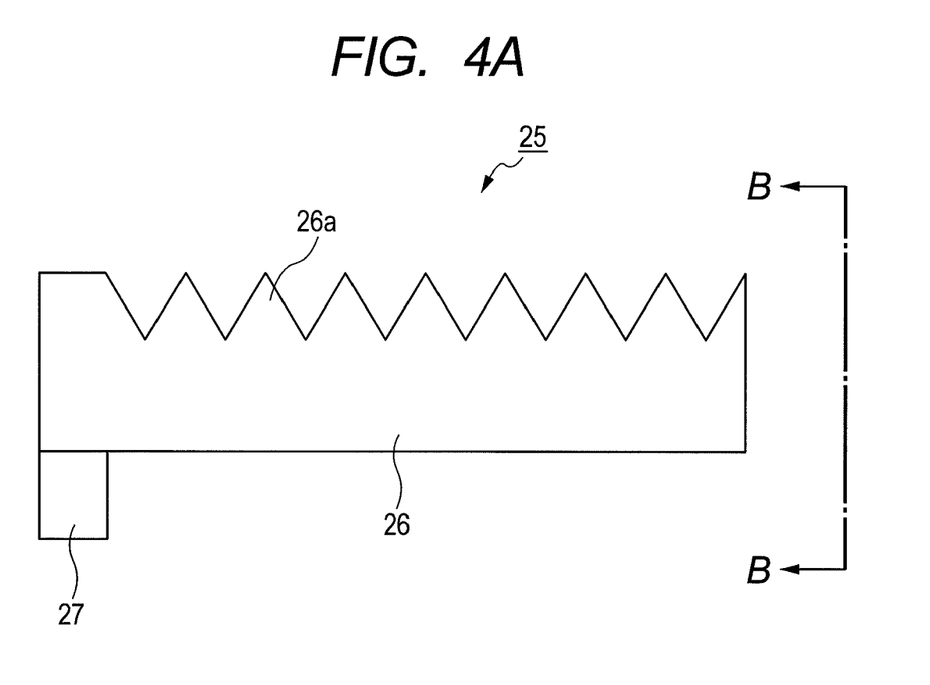
FIGS. 4A and 4B illustrate the respective enlarged views of a discharge starting auxiliary electrode according to the first embodiment of the present invention.
Figure 4B:
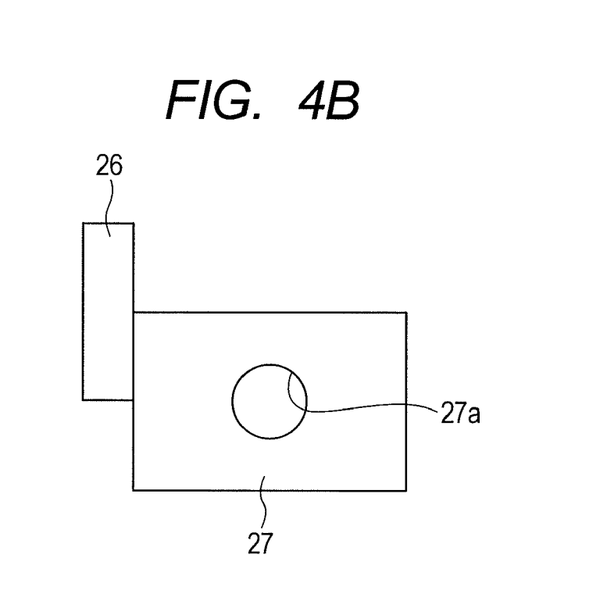

FIGS. 4A and 4B illustrate the respective enlarged views of the discharge starting auxiliary electrode. FIG. 4A illustrates a side view of the discharge starting auxiliary electrode 25, and FIG. 4B is a fragmentary view taken along the line B-B. The discharge starting auxiliary electrode 25 is formed by a thin metal sheet having high resistance to corrosion, such as a stainless steel including SUS304, a nickel alloy, and a high-melting material. The discharge starting auxiliary electrode 25 is structured by joining an electrode part 26 having projections 26a with a latching part 27 latched together to the measuring element container (cathode) 1.

The latching part 27 has a screw hole 27a to latch together a screw 16 thereto. The discharge starting auxiliary electrode 25 can be detachably mounted to the measuring element container (cathode) 1 on the insulating member 6 side by inserting and tightening the screw 16 to the screw hole 27a. That is, the latching part 27 locates the discharge starting auxiliary electrode 25 at a specified position in the discharge space 9. The electrode part 26 is integrally joined with the latching part 27, and the electrode part 26 and the latching part 27 are configured so as to have a spatial arrangement in which their sheet-thickness directions become orthogonal. When the discharge starting auxiliary electrode 25 is mounted on the measurement element container (cathode) 1, a plurality of projections 26a is arranged in parallel with the axial direction (axially longitudinal direction) of the anode 2. The term "parallel" referred to herein signifies the state in which the plurality of projections 26a of the electrode part 26 (and 56) is arranged in nearly parallel with the axial direction of the anode 2. Although the planar shape of the electrode part 26 is not limited to rectangular shape, the planar shape is required to have at least a portion positioned in the axial direction of the anode 2.

Naturally, the discharge starting auxiliary electrode 25 may be attached to the pole piece 14. Any shape of the projection 26a can be used if only the projection 26 has a sharp tip relative to the outer circumference of the anode 2 because the sharp tip gives high effect of releasing electrons at low voltages. Similarly, the thickness of the projection 26a at a portion facing the anode 2 of the discharge starting auxiliary electrode 25 is preferably about 100 μm, and specifically the tip portion of the projection 26a is preferably formed to further thin shape. Thinner tip gives higher effect of releasing electrons at low voltages.

The discharge starting auxiliary electrode 25 has the electrode part 26 which extends toward the insulating member 6 side of the measuring element container (cathode) 1, or extends from the latching part 27 latched together to the pole piece 14 toward the center of the discharge space 9. Consequently, the discharge can be caused at a region near the center of the discharge space 9, which allows starting discharge more reliably. In addition, by forming the discharge starting auxiliary electrode 25 into a narrow-width plate shape, the nonuniformity of electric field in the discharge space 9 can be minimized, thus minimizing the influence of discharge characteristics resulting from the placement of the discharge starting auxiliary electrode 25.

The above first embodiment described the structure in which, when the discharge starting auxiliary electrode 25 is mounted in the measuring element container (cathode) 1, a plurality of projections 26a is arranged in the axial direction (axially longitudinal direction) of the anode 2. The structure, however, is only required to have at least one projection 26a on the front end side of the electrode part 26. However, in order to trigger the discharge in a short time even for the case that sputtered films or products stick to inside surface of the measuring element of the vacuum gauge after the gauge is used for a long period of time, it is preferable to form a plurality of projections 26a on the electrode part 26.

Figure 5A:
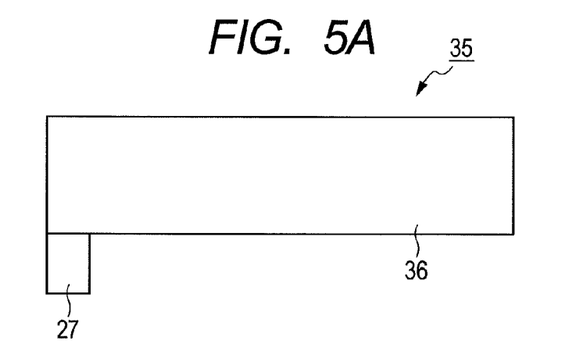
FIGS. 5A to 5E illustrate examples of other structures of the discharge starting auxiliary electrode of the present invention.
Figure 5B:
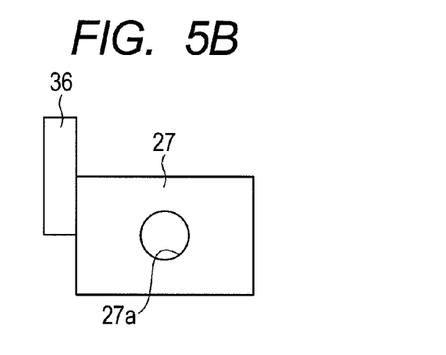
Figure 5C:
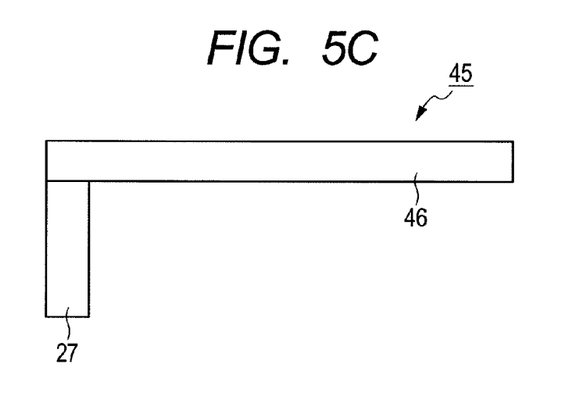
Figure 5D:
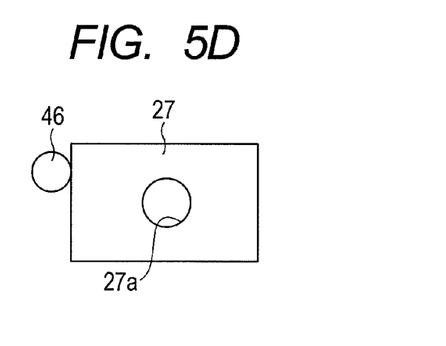

FIGS. 5A to 5E, and FIG. 6 illustrate examples of other structures of the discharge starting auxiliary electrode. Instead of the discharge starting auxiliary electrode 25 (refer to FIG. 4), discharge starting auxiliary electrodes 35, 45, 55 and 65 can be used. FIG. 5A illustrates a side view of the discharge starting auxiliary electrode 35, and the front view thereof is given in FIG. 5B. The discharge starting auxiliary electrode 35 is structured by an electrode part 36 having no projection. The side view of the discharge starting auxiliary electrode 45 is given in FIG. 5C, and the front view thereof is given in FIG. 5D. The discharge starting auxiliary electrode 45 is structured by a thin wire 46 (wire member) at a portion corresponding to the electrode part 26 of the discharge starting auxiliary electrode 25.

Figure 5E:
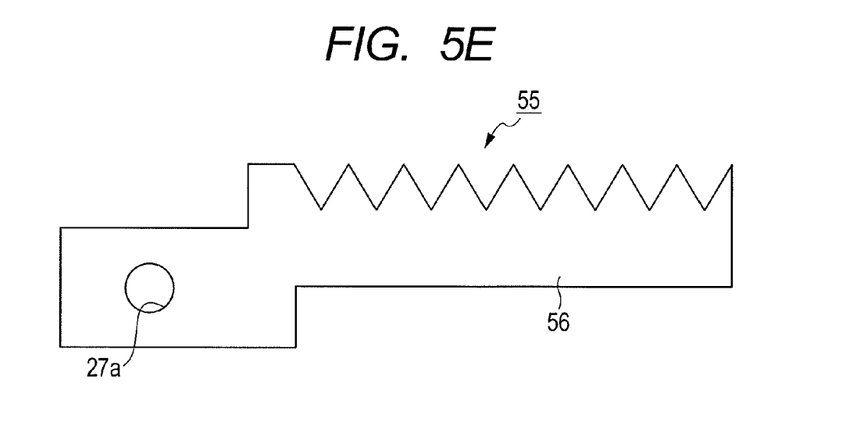

The discharge starting auxiliary electrode 55 given in FIG. 5E is structured so that the electrode part 26 extends from the latching part 27, and can be mounted on the pole piece 14 side connected electrically with the cathode 1. Attaching to the pole piece 14 brings the maintenance further convenient, thus allowing simultaneous exchange of the discharge starting auxiliary electrode 55 and of the pole piece 14. Similar effect can be attained for the other discharge starting auxiliary electrodes 25, 35 and 45 by attaching them respectively to the pole piece 14.

When the discharge starting auxiliary electrode 55 given in FIG. 5E is used, it is installed such that an electrode part 56 becomes parallel with the anode 2.

Although the lengths of the electrode parts 26, 36 and 46 in the axial direction (axially longitudinal direction) are not specifically limited, they are required to have at least a portion positioned in the axial direction of the anode 2. The direction of positioning the electrode parts 26, 36 and 46 may be on the insulating member 6 side other than the front end side (vacuum container side) of the anode. Also in the case that the electrode parts 26, 36 and 46 are respectively extended to the insulating member 6 side, there has been confirmed the effect exceeding that of the prior art.

Figure 6:
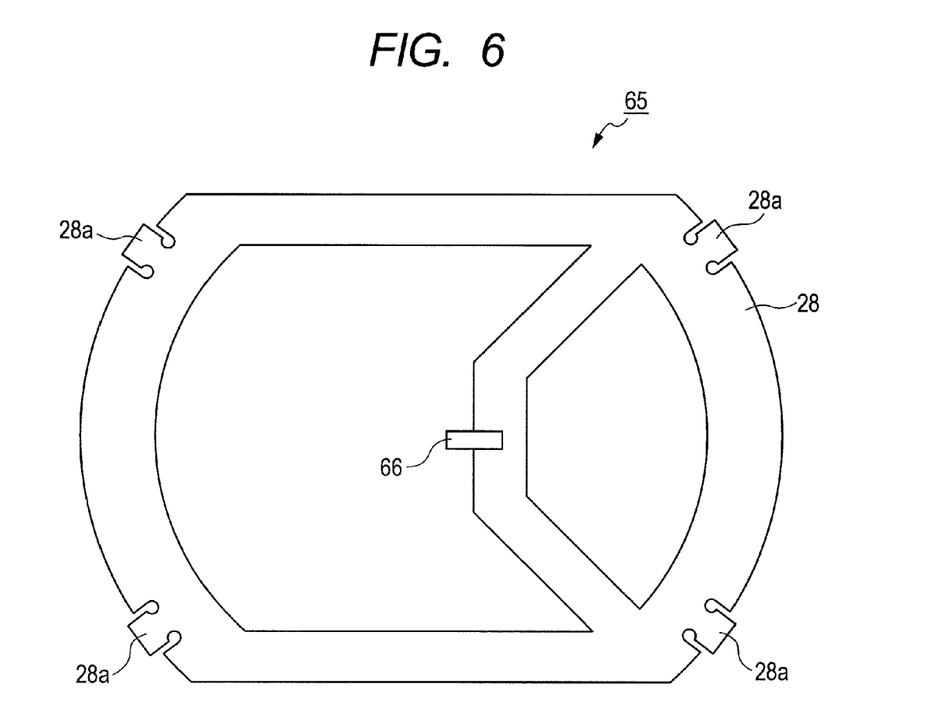
FIG. 6 illustrates an example of still other structure of the discharge starting auxiliary electrode of the present invention.

FIG. 6 shows the front view of the discharge starting auxiliary electrode 65. In the discharge starting auxiliary electrode 65, an electrode part 66 is attached to a latching part 28 having claws 28a that elastically deform. The width of the latching part 28 in the longitudinal direction is brought to slightly smaller than the inner diameter of the measuring element container (cathode) 1, and the dimension of the front end of the claw 28a is brought to slightly larger than the inner diameter of the measuring element container (cathode) 1. As a result, the electrode part 66 can be attached without using the screw 16, and thus the exchange work of the discharge starting auxiliary electrode 65 and other work can be done more swiftly at higher accuracy.

That is, by keeping pressing the inner side of the measuring element container (cathode) 1 outward by the claws 28a, the latching part 28 can be fixed at a specified position in the measuring element container (cathode) 1. In this state, the electrode part 66 mounted vertically to the latching part 28 is positioned parallel with the anode 2. The electrode part 66 can adopt other shapes including the shapes of electrodes 26, 36 and 46. The state that the electrode part 26 and the like is positioned in parallel with the anode 2 is the state that the axial direction of the anode 2 becomes nearly parallel with the longitudinal direction of the electrode parts 26, 36, 46, 56 and 66, and further includes the state that a portion of the electrode parts 26, 36, 46, 56 and 66 facing the outer circumference of the anode 2 is positioned nearly in parallel with the axial direction of the anode 2.

The above first embodiment described the cold cathode ionization vacuum gauge having each one of the discharge starting auxiliary electrodes 25, 35, 45, 55 and 65, (hereinafter referred to simply as "25 and the like"). However, there can be applied a structure having a plurality of discharge starting auxiliary electrodes (25 and the like). In the latter case, it is preferable that the plurality of discharge starting auxiliary electrodes (25 and the like) arranged around the anode 2 are located symmetrically centering on the axial line of the anode 2. By structuring the cold cathode ionization vacuum gauge as above, the triggering of discharge can be done in a short time without complicating the structure of vacuum gauge even when films and contaminants stick to the surface of the electrode after a long period of operation. Specifically for the discharge starting auxiliary electrodes 25, 35, 45 and 55 according to the first embodiment, the effect of shortening the discharge triggering time can be exerted over a long period of time, thus significantly extending the life (interval of maintenance works) compared with known electrode structures. The interval of required maintenance works using the cold cathode ionization vacuum gauge according to the first embodiment was measured, and the interval was 20 times or more the interval for the vacuum gauge having conventional electrode structure.

According to the present invention, it is important that the discharge starting auxiliary electrode has an electrode part (26, 36, 46, 56 or 66) including at least a region extending in the axially longitudinal direction of the anode in order to position (as far as possible), in the axially longitudinal direction of the anode, the member (discharge starting auxiliary electrode) for quickly triggering the discharge in the discharge space 9. Therefore, although in the first embodiment, the axially longitudinal direction of the electrode part in the discharge starting auxiliary electrode is located in parallel with the axially longitudinal direction of the anode, there may be generated slight displacement from the parallel positioning between the axially longitudinal direction of the electrode part and the axially longitudinal direction of the anode. In addition, the location of the discharge starting auxiliary electrode can be at an arbitrary position in the discharge space 9 if only at least a portion of the electrode part in the discharge starting auxiliary electrode extends in the axially longitudinal direction of the anode, (for example, if only the portion is in parallel with the axially longitudinal direction of the anode).

According to the first embodiment, the rod-shape electrode (reference numeral 2) is adopted as the anode, and the cylindrical electrode (reference numeral 1) positioned so as to surround the rod-shape electrode is adopted as the cathode. However, the above rod-shape electrode can be adopted as the cathode, and the above cylindrical electrode can be adopted as the anode. The structure of the anode and of the cathode is not limited to above-given one. As described above, the present invention does not have the characteristic in the shape and the positioning of the anode and of the cathode in the cold cathode ionization vacuum gauge. Therefore, the shape and the positioning of the anode and of the cathode can be arbitrary if only they can create a discharge space and can provide function of the cold cathode ionization vacuum gauge.

[Second Embodiment]

Figure 7:
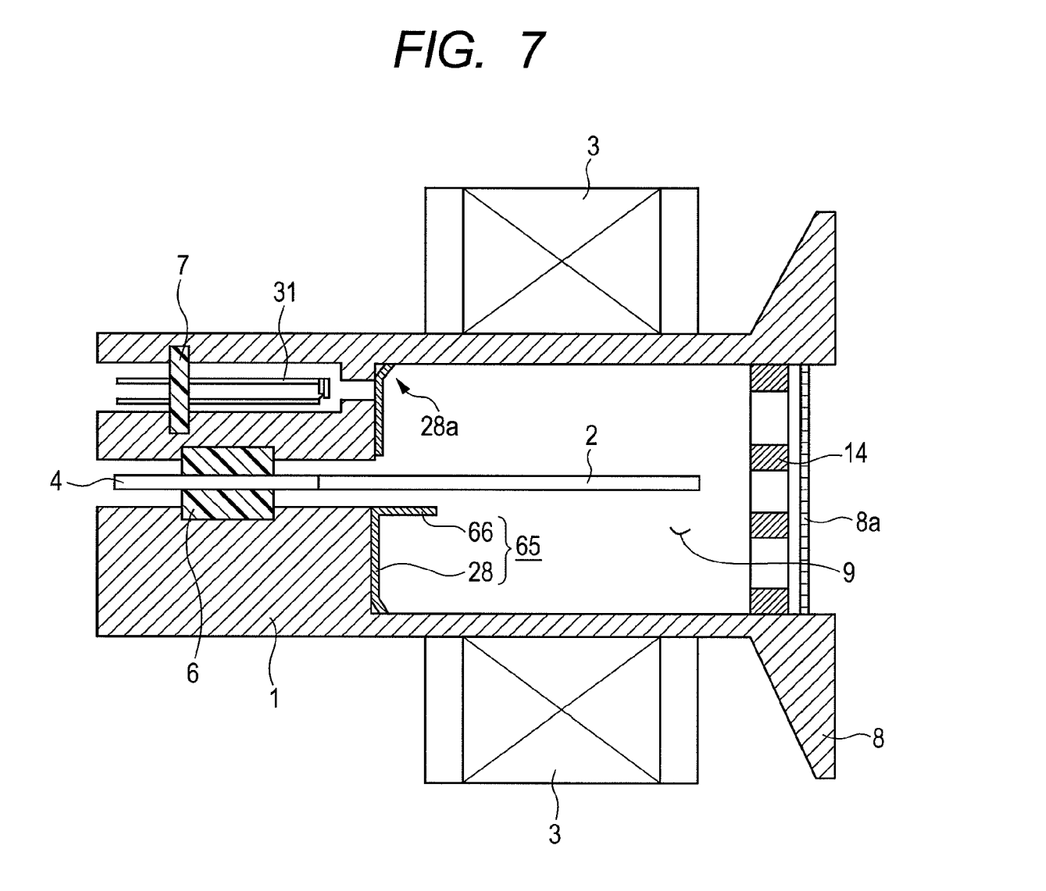
FIG. 7 is a transverse sectional view of the cold cathode ionization vacuum gauge according to a second embodiment of the present invention.

FIG. 7 is a schematic sectional view of the vacuum processing apparatus having the cold cathode ionization vacuum gauge according to the second embodiment of the present invention. For the same structure and same member as those in the first embodiment, the same reference numeral is given, and no further detail description thereto is given. The cold cathode ionization vacuum gauge according to the second embodiment is a composite vacuum gauge with a built-in Pirani gauge filament 31 fixed by an insulating member 7. In regions from low-vacuum to medium-vacuum, the measurement is given as the Pirani gauge, while in regions from medium-vacuum to high-vacuum, the measurement is given as the cold cathode ionization gauge, thus providing the measurement in ranges from low-vacuum to high-vacuum.

Although the cold cathode ionization vacuum gauge according to the second embodiment has the discharge starting auxiliary electrode 65, other discharge starting auxiliary electrode 25 or the like can naturally be mounted thereon. Therefore, even when the discharge starting auxiliary electrode 25 or the like is mounted on the composite vacuum gauge, similar effect to that described in the first embodiment can also be attained.

Figure 8:
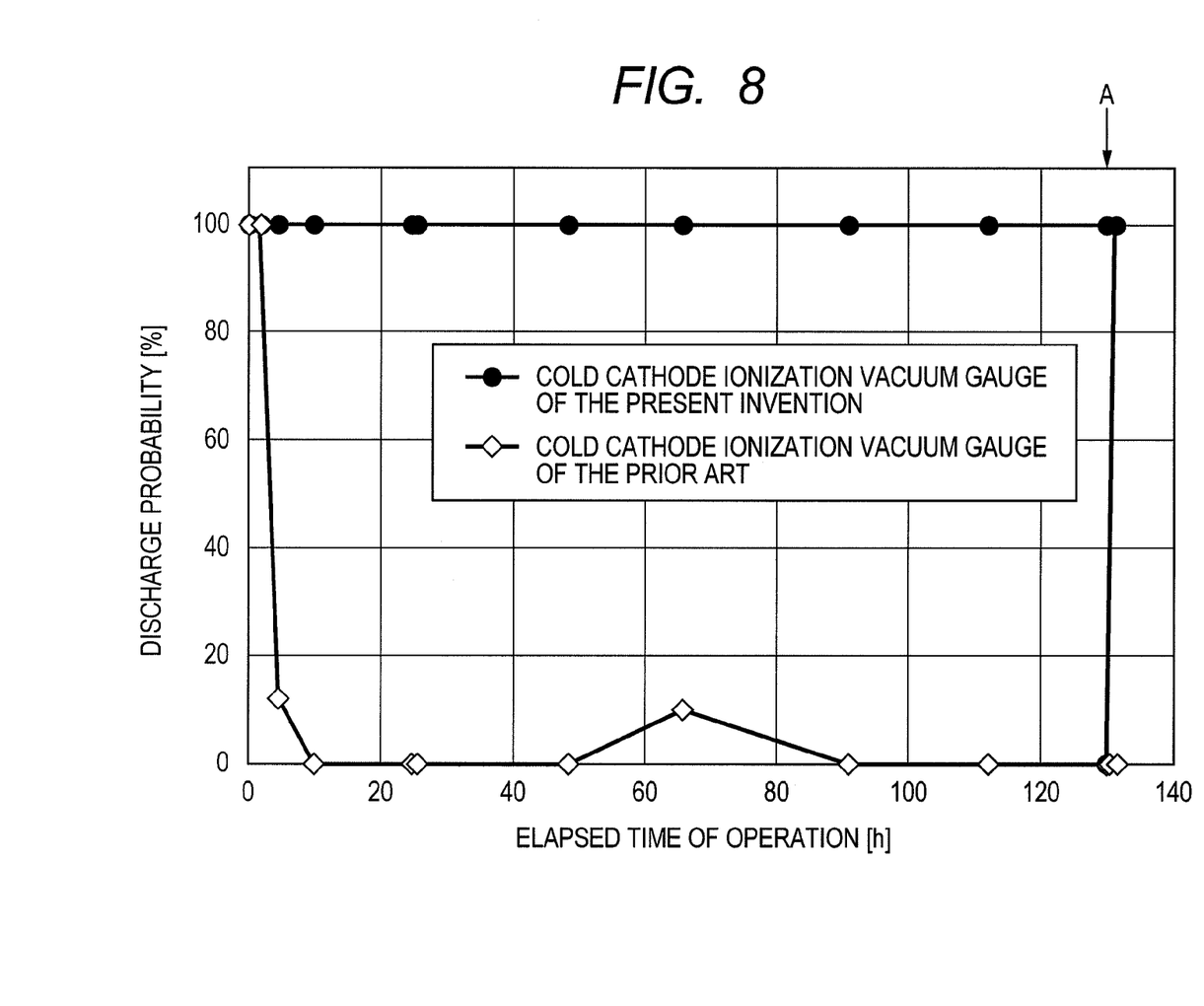
FIG. 8 is a comparative graph of starting life between the cold cathode ionization vacuum gauge of the present invention and a cold cathode ionization vacuum gauge of the related art.

FIG. 8 is a comparative graph of starting life between the cold cathode ionization vacuum gauge of the present invention and the cold cathode ionization vacuum gauge of the prior art. The cold cathode ionization vacuum gauge of the present invention applied for the comparative measurement was the one having the discharge starting auxiliary electrode 65. The cold cathode ionization vacuum gauge of the prior art applied for the comparative measurement was the one having a discharge starting auxiliary electrode including projections from the cathode toward the anode. The internal pressure of the vacuum container for pressure measurement was kept to $1\times10^{-5}$ Pa. The elapsed time of operation as the horizontal axis of FIG. 8 is the elapsed time of operation in an environment of a pressure region (0.1 Pa) as a heavy load to the cold cathode ionization vacuum gauge, created by introducing nitrogen gas at a specific flow rate; or the elapsed time of discharge in an upper-limit region of measuring pressure, which upper-limit region allows easily progressing the contamination and the deterioration in the sensor of the cold cathode ionization vacuum gauge. The discharge probability as the vertical axis of FIG. 8 is an average value of 10 times of measurements; the case of starting discharge within 1 second after applying power to the cathode 1 and to the anode 2 of the cold cathode ionization vacuum gauge is defined to 100%; the case of starting discharge within a range from 1 to 5 seconds after applying power thereto is defined to 50%; and the case of not-starting discharge even after 5 seconds thereafter is defined to 0%.

The cold cathode ionization vacuum gauge of the prior art shows significant reduction of discharge probability after 5 hours of elapsed time of operation. To the contrary, the cold cathode ionization vacuum gauge of the present invention maintains 100% of discharge probability up to 130 hours. The result shows that the cold cathode ionization vacuum gauge of the present invention has excellent starting life compared with that of the cold cathode ionization vacuum gauge of the prior art, and thus the cold cathode ionization vacuum gauge of the present invention can significantly extend the interval of maintenance works. After further operating for 130 hours (the point A in FIG. 8), the cold cathode ionization vacuum gauge of the present invention is once released to atmospheric pressure, then the starting performance deteriorated. The measurements reveals that the phenomenon of deterioration in the starting performance does not occur at around 100 hours of elapsed time of operation in a 0.1 Pa of nitrogen atmosphere, and that the phenomenon becomes significant at 120 hours or longer elapsed time of operation. However, the cold cathode ionization vacuum gauge of the present invention which deteriorated in the discharge probability by releasing the pressure to atmospheric pressure can be recovered in the discharge probability by an aging treatment (aging step) described later. When the elapsed time of operation increases, the starting performance deteriorates even without exposure to atmosphere. Also in that case, however, applying the aging treatment described later can recover the starting performance.

The recovery of starting performance by aging treatment is described below. The aging treatment is a treatment to recover the starting performance (discharge probability) of the cold cathode ionization vacuum gauge of the present invention, and is a treatment of letting the cold cathode ionization vacuum gauge of the present invention, deteriorated in the discharge probability owing to a long period of operation or to standing in atmospheric environment, discharge for a specified period of time (operation for a specified period of time) in a specific environment. The combination of the specific environment with the discharge period (specified period of time), or the aging condition, became effective under a condition of discharging under 0.1 Pa of nitrogen gas pressure for 0.5 hour or more, and thus the discharge probability recovered to 100%. In FIG. 8, the plot of 100% discharge probability during a period of 132 hours of elapsed time of operation is the measurement after the aging. The aging condition is naturally not limited to the above one. There has been confirmed a similar effect under a condition of 0.05 Pa of nitrogen gas pressure for 1 hour and a condition of introducing argon gas instead of nitrogen gas.

As described above, the cold cathode ionization vacuum gauge according to the present invention can recover the starting performance by the above aging treatment without cleaning of inside the sensor and without exchanging the respective electrodes. The cause of deterioration in the starting performance in the cold cathode ionization vacuum gauge of the present invention is presumably the decrease in the rate of secondary electron emissions resulted from the adhesion of sputtering products to around the front end of the discharge starting auxiliary electrode (25 and the like) and from the changes in quality of the surface of the attached substances. As for the recovery of discharge probability by the aging operation, a presumable cause is that the front end of the discharge starting auxiliary electrode (25 and the like) is cleaned by the ion impaction.

What is claimed is:

1. A cold cathode ionization vacuum gauge comprising:
an anode;
a cathode disposed so as to form a discharge space together with the anode; and
a discharge starting auxiliary electrode disposed in the discharge space,
wherein the discharge starting auxiliary electrode has an electrode part having a plurality of projections for triggering discharge between the anode and the cathode wherein the plurality of projections is arranged in parallel with an axially longitudinal direction of the anode such that a sharp tip of the projection directs to the anode.

2. A cold cathode ionization vacuum gauge according to claim 1, wherein the electrode part is made of a wire.

3. A cold cathode ionization vacuum gauge according to claim 1, wherein a plurality of the discharge starting auxiliary electrodes is disposed around the anode.

4. A cold cathode ionization vacuum gauge according to claim 1, wherein the electrode part has a plate shape member positioned such that a sheet-thickness direction of the plate shape member is orthogonal to the axially longitudinal direction of the anode, and the plurality of projections is arranged along a longitudinal direction of the plate shape member.

5. A cold cathode ionization vacuum gauge according to claim 1,
wherein the discharge starting auxiliary electrode has a latching part connected to the electrode part, the latching part having a claw that elastically deforms,
one of the anode and the cathode is a measurement element container, and
by keeping pressure on an inner side of the measurement element container outward by the claw, the latching part is fixed to the measurement element container.

6. A vacuum processing apparatus comprising the cold cathode ionization vacuum gauge according to claim 1.

7. A discharge starting auxiliary electrode for use in a cold cathode ionization vacuum gauge having an anode and a cathode disposed so as to form a discharge space together with the anode, comprising:
a member configured to place the discharge starting auxiliary electrode in the discharge space; and
an electrode part including a plurality of projections for triggering discharge between the anode and the cathode wherein the plurality of projections is arranged in parallel with an axially longitudinal direction of the anode such that a sharp tip of the projection directs to the anode when the discharge starting auxiliary electrode is placed in the discharge space.

* * * * *